April 28, 1931.   L. E. MORRISON   1,803,270
TIRE VALVE AND GAUGE
Original Filed Oct. 22, 1923
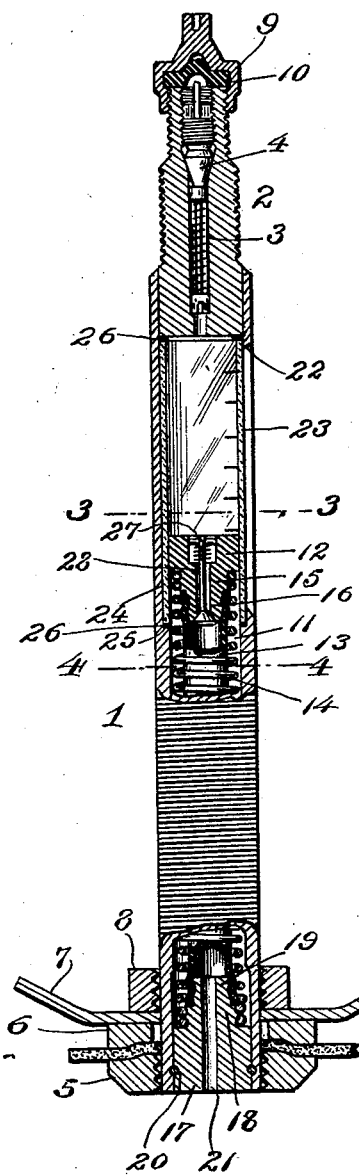
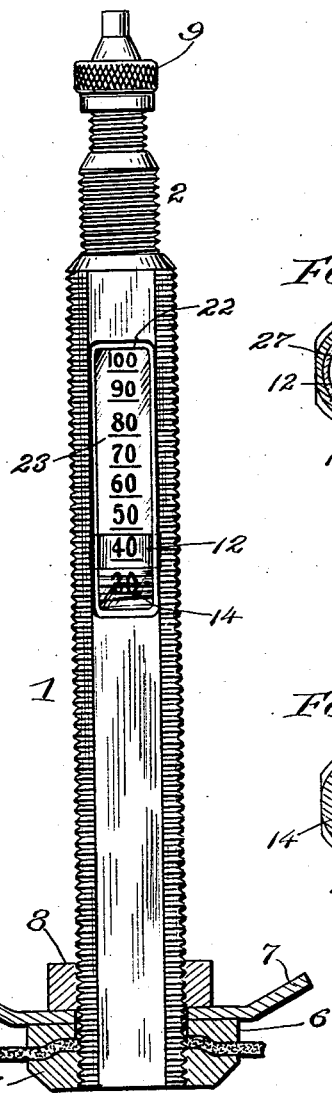
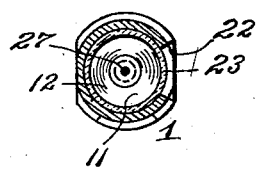
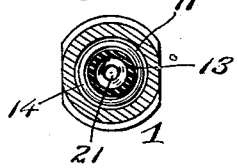
INVENTOR
Luther E. Morrison Patented Apr. 28, 1931

1,803,270

UNITED STATES PATENT OFFICE

LUTHER E. MORRISON, OF NEW YORK, N. Y.

TIRE VALVE AND GAUGE

Application filed October 22, 1923, Serial No. 669,926. Renewed January 21, 1930.

This invention is directed to an improved form of tire valve and gauge adapted more particularly for permanent attachment to the inner tube of an automobile tire. In the specific embodiment illustrated, the pressure indicator is located within a closed chamber formed within the valve casing and is visible through a sealed window in the side of the casing, such window being provided with graduations to cooperate with the movable pointer of the indicator. This closed chamber of the valve casing is not only sealed against the entrance of dust or grit, but is completely closed to the atmosphere when the device is in use. As a result, the pressure indicator is protected at all times from outside disturbances and hence is less liable to failure, but even in the event of failure, no air can escape from the tire, due to the closed character of the chamber in which it is located, so that in such circumstances the device may still be used as a valve in the ordinary way.

The exact construction and operation of the parts will be fully pointed out in the detailed description to follow.

Referring to the drawings:

Fig. 1 is a front elevation of the improved device.

Figure 2 is a longitudinal section taken on the line 2—2 of Fig. 1;

Fig. 3 is a cross-section taken on the line 3—3 of Fig. 2; and

Fig. 4 is a cross-section taken on the line 4—4 of Fig. 2.

While the valve casing might be made in one piece, or otherwise constructed, it is herein shown as made up of two distinct parts, to wit, a body portion 1, in the form of a hollow open-ended tube exteriorly screw-threaded, and a head portion 2 fitted air-tight in the upper end of said body portion, as by soldering or otherwise, and also exteriorly screw-threaded. The head portion 2 is formed with an air passage 3 and contains an inflating valve 4, of the usual type, while the body portion 1 is provided with a flange 5, washer 6, supporting plate 7, and clamping nut 8, which constitute the means for attaching the device permanently to the tire.

As thus constituted, the valve casing conforms generally to the standard type of casing now in use and hence is capable of employment in connection with the regular tire equipment. A screw-cap 9, of standard form and containing a rubber washer 10, is or may be threaded onto the upper end of the head portion 2 in order to prevent leakage of air past the valve 4.

It is pointed out that the valve casing, when constructed in the manner set forth, presents a long interior cavity or chamber 11 extending downwardly from the head portion 2 through the base of the body portion 1. Located within this chamber 11 is a pressure indicator which, in the present instance, is in the form of a movable plug 12 operatively connected to an extensible pressure tube 13 (preferably of rubber) and to a helical spring 14 surrounding the rubber tube. In providing for such connection of the parts, the movable plug or indicator 12 is provided with a screw-threaded portion 15, onto which the upper end of the spring 14 is threaded, and a circumferentially ribbed portion 16, to which the upper end of the pressure-tube 13 is secured in an air-tight manner. At their lower ends, the spring 14 and pressure-tube 13 are anchored to a stepped plug 17 fitted in an air-tight manner in the lower end of the body portion 1 and having, like the indicator plug 12, a screw-threaded portion 18 and a circumferentially ribbed portion 19 for the attachment of the spring and tube, respectively. If desired, the plug 17 may be provided with a gasket 20 (of rubber or soft metal) to insure the air-tight sealing of the lower end of the casing. To establish connection between the pressure-tube 13 and the interior of the tire, the plug 17 is formed with a central opening 21 through which the air may pass.

In order that the indicator may be visible from the outside, the body portion 1 (being non-transparent) is formed in its front side with an elongated opening 22, which is covered by a transparent tube or member 23 (preferably of glass) located in a recess 24 formed in the upper part of the body portion 1. At its lower end, the glass tube 23 rests upon an annular shoulder 25 formed by the recess 24, and at its upper end, the tube is engaged by the head portion 2 which serves to hold it firmly in place upon the shoulder 25. Gaskets 26, of rubber or any suitable material, are preferably arranged at the upper and lower ends of the glass tube so as to prevent the escape of air at these points. In practice, it may be desirable to coat the glass tube with cement or other binding substance, in order to insure a perfect air-tight fit around the opening 22. To facilitate the reading of the indicator, the glass tube 23 is provided with suitable graduations to co-operate with the movable plug 12, although such graduations might be formed on the outside of the casing or even on the plug itself, if the latter were made long enough for the purpose. However, it is preferred to place the graduations on the glass tube, as shown, to render them more conspicuous. In this connection, it may be noted that the movable plug 12 may be painted or otherwise colored to render it more readily visible in operation.

It remains to be described how air may be introduced into the tire. This is accomplished by the provision of an automatic check valve 27, which will admit air into the tire from the chamber 11. In the present instance, this check valve 27 (which may be of any suitable type) is mounted in the movable indicator plug 12, which latter is formed with an air passage 28 leading from the chamber 11 into the pressure-tube 13. Consequently, when air is pumped into the chamber 11 by the opening of the inflating valve 4, it forces its way through the passage 28 into the pressure-tube 13 and thence into the tire, the check valve 27 acting, of course, to prevent air from flowing back into the chamber 11 from the pressure-tube. During the period of inflation, the indicator plug 12 will be held down by the air pressure within the chamber 11 and hence will fail to register at this time. However, to obtain a reading of the indicator, it is only necessary to vent the air chamber 11, which may be done by disconnecting the pump hose from the casing and holding the valve 4 open by hand. When this is done, the air within the chamber 11 will be at atmospheric pressure and hence will allow the indicator plug 12 to be forced upwardly by the air pressure within the tire against the combined action of the spring 14 and pressure-tube 13, the latter being held against lateral expansion by the surrounding spring. It will be understood that in calibrating the glass tube 23, the atmospheric pressure will be taken into account. As will be evident, once the tire is inflated, the pressure indicator will function at all times to indicate the pressure within the tire, the plug 12 rising or falling according as the pressure increases or diminishes. However, when it is necessary to know the exact pressure within the tire, it may be desirable to vent the air chamber 11 whenever a reading is taken, as there may be some leakage of the air past the check valve 27 while the device is in use.

It is not absolutely essential that the valve casing be provided with the valve mechanism 4, as the check valve 27 will, of course, confine the air within the tire, and even in the event of failure of the pressure-tube 13, the screw-cap 9 would prevent the escape of air from the tire. However, by the use of the valve mechanism 4, the device could be employed indefinitely as an inflating valve, even after the failure of the pressure indicator, not to mention other advantages which are inherent in the valve mechanism itself.

The advantages of the improved device will now be apparent. As before stated, all the indicator parts are completely enclosed within the valve casing and hence are fully protected against the harmful effects of dust or grit or other foreign substances, so that their operation is fully reliable under all conditions of use. Moreover, even in the event of failure of the indicator, due, for example, to the rupture of the rubber pressure-tube, no harm can result, as the air will simply flow into the closed chamber in which the indicator is located and thus be prevented from escaping to the atmosphere. The valve mechanism consequently remains intact and free to function independently as long as may be desired. It is also to be noted that the device is extremely simple and can be made at small cost and without involving any radical alteration in the standard tire equipment. In addition, the parts are strong, durable and compact, and capable of being assembled with the least difficulty and delay. Thus, all of the parts of the indicator may be fitted together on the workbench, and then inserted as a unit into the valve casing, without any further manipulation. The several parts of the valve casing may be assembled with equal ease and facility and, moreover, are such that they may be manufactured at very low cost. Another important advantage is the large space allowed for the pressure indicator, whose parts may, therefore, be made larger and stronger than would otherwise be possible. The invention has been illustrated herein merely by way of example and in preferred form, and obviously many alterations and changes therein will readily suggest themselves to those skilled in the art without departing from the spirit of the invention, or sacrificing its chief advantages. It should be understood, therefore, that the invention is not limited to any specific form or embodiment, except in so far as such limitations are specified in the claims.

While the present device has been designed strictly as a combined valve and indicator, the construction is susceptible of other uses as well.

Having thus described my invention, its construction and mode of operation, what I claim and desire to secure by Letters Patent of the United States is as follows:

1. In a tire valve and gauge, the combination of a casing having an interior air chamber, a one-way valve mounted in the upper end of said casing and controlling the admission of air into the interior chamber, an extensible pressure tube located within said interior air chamber and anchored at its lower end to said casing and communicating with the tire, the upper end of said tube being free a movable indicator plug connected in an air-tight manner to the free upper end of said tube and visible through the side of the casing, a spring also connected to said indicator plug and anchored at its lower end to the casing, and a one-way valve mounted in said indicator plug and controlling the admission of air from the interior chamber into the pressure tube.

2. In a tire valve and gauge, the combination of a casing having an interior air chamber and formed with an elongated opening in its side, a transparent element covering said opening, a one-way valve mounted in the upper end of the casing and controlling the admission of air into the interior chamber, a movable indicator plug located within the interior chamber in position to show through the side opening and presenting at its lower side two cylindrical portions of different diameters, a closing plug fitted air-tight in the lower end of the interior chamber and presenting at its upper side two cylindrical portions corresponding to those of the movable indicator plug, an extensible pressure tube attached at its opposite ends in an air-tight manner to the smaller cylindrical portions of the indicator and closing plugs, said tube being disconnected at its upper end from the casing, a helical spring surrounding the pressure tube and attached at its opposite ends to the larger cylindrical portions of said indicator and closing plugs, air passages extending through both the indicator and closing plugs, and a one-way valve mounted in said movable indicator plug and controlling the admission of air into the pressure tube from the interior chamber of the casing.

3. In a device of the character described, the combination of a casing adapted to be attached to an air receptacle and having an interior air chamber and an air inflating passage leading thereinto, an extensible pressure tube located within said interior air chamber and anchored at its lower end to said casing and communicating with the air receptacle, said tube being free at its upper end, a movable plug connected in an air-tight manner to the free upper end of said pressure tube, a helical spring also connected to the movable plug and anchored at its lower end to the casing, and a one-way valve mounted in said movable plug and controlling the admission of air from the interior chamber into the pressure tube.

4. In a device of the character described, the combination of a casing adapted to be attached to an air receptacle and having an interior air chamber and an air inflating passage leading thereinto, a movable plug located within the air chamber and presenting at its lower side two cylindrical portions of different diameters, a fixed plug fitted air-tight in the lower end of the interior chamber and presenting at its upper side two cylindrical portions corresponding to those of the movable plug, an extensible pressure tube attached at its opposite ends in an air-tight manner to the smaller cylindrical portions of the two plugs, said tube being disconnected at its upper end from the casing, a helical spring surrounding the pressure tube and attached at its opposite ends to the larger cylindrical portions of the two plugs, air passages extending through both plugs, and a one-way valve mounted in the movable plug and controlling the admission of air into the pressure tube from the interior chamber.

5. A combined inflation valve and gauge, including a casing having means for connecting it at one end to an inflatable receptacle and provided at its other end with means for permitting the inflation of the receptacle while preventing the escape of the inflating medium therefrom after inflation, and a spring-restrained plunger slidable within the casing responsive to the pressure within said receptacle and provided with an inwardly-opening check-valve; whereby the inflating medium may be introduced into the receptacle and the pressure indicated by the plunger after venting the casing to the atmosphere.

6. A combined inflation valve and gauge including a casing provided at its inner end with means for connecting it to an inflatable receptacle and at its outer end with a check-valve, a spring-restrained plunger slidable in said casing responsive to pressure within said receptacle, and an inwardly opening check-valve in said plunger, whereby the inflating medium may be introduced into said receptacle through both check-valves, and the pressure indicated by said plunger after venting said casing to the atmosphere by opening the outermost valve.

In testimony whereof, I have affixed my signature hereto.

LUTHER E. MORRISON.